(12) United States Patent
Suzuki et al.

(10) Patent No.: US 7,815,035 B2
(45) Date of Patent: Oct. 19, 2010

(54) WORK LOCATING CONVEYER, WORK LOCATING METHOD, AND WORK LOCATING CONVEYER CARRIAGE

(75) Inventors: Keiichiro Suzuki, Fujisawa (JP); Setsuo Nakamura, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 852 days.

(21) Appl. No.: 11/315,586

(22) Filed: Dec. 23, 2005

(65) Prior Publication Data

US 2006/0143894 A1 Jul. 6, 2006

(30) Foreign Application Priority Data

Dec. 27, 2004 (JP) ............... 2004-378102

(51) Int. Cl.
| | |
|---|---|
| B65G 15/64 | (2006.01) |
| B65G 21/22 | (2006.01) |
| B65G 47/22 | (2006.01) |
| B65G 47/24 | (2006.01) |
| B65G 49/00 | (2006.01) |

(52) U.S. Cl. .............. 198/463.1; 198/345.1; 198/345.2; 198/345.3; 198/465.1

(58) Field of Classification Search .............. 198/345.1, 198/345.2, 345.3, 465.1
See application file for complete search history.

(56) References Cited

U.S. PATENT DOCUMENTS

| | | | | |
|---|---|---|---|---|
| 3,379,298 | A | * | 4/1968 | Willis ....................... 198/345.2 |
| 4,483,476 | A | * | 11/1984 | Fujikawa et al. ............. 228/4.1 |
| 4,667,805 | A | * | 5/1987 | Antoszewski .......... 198/341.05 |
| 4,773,156 | A | * | 9/1988 | Kurita ......................... 29/783 |
| 4,860,663 | A | * | 8/1989 | Naruse et al. ............... 104/162 |
| 5,052,540 | A | * | 10/1991 | Matsuyama et al. ...... 198/346.1 |
| 5,320,210 | A | * | 6/1994 | Van Den Bergh et al. 198/465.1 |
| 5,505,290 | A | * | 4/1996 | Fujii et al. ............... 198/345.1 |
| 5,518,109 | A | * | 5/1996 | Dailey et al. ................ 198/834 |
| 6,467,675 | B1 | * | 10/2002 | Ozaku et al. ................ 228/175 |
| 2007/0029162 | A1 | * | 2/2007 | Aulanko et al. ............. 198/333 |

FOREIGN PATENT DOCUMENTS

| | | |
|---|---|---|
| EP | 1 241 085 A2 | 9/2002 |
| EP | 1 293 419 A2 | 3/2003 |
| JP | 63-272434 A | 11/1988 |
| JP | 2-250737 A | 10/1990 |

(Continued)

*Primary Examiner*—Gene Crawford
*Assistant Examiner*—Yolanda Cumbess
(74) *Attorney, Agent, or Firm*—Foley & Lardner LLP

(57) ABSTRACT

A work locating conveyer, including: a locator disposed on a conveyer carriage and configured to locate and support a work; a locating jig disposed on the respective locator and configured to locate and support the works having different configurations; and a driver. The driver includes: an original position mover configured to move a main locator in such a manner that the main locator follows a moving path on the conveyer carriage to an original position on the moving path, a jig returner configured to return the main locating jig to the non-use state, a jig locating mover configured to move the main locator from the original position to a certain locating position on the moving path, and a locating jig selective mover configured to move from the non-use state to the in-use state the main locating jig that is to be used.

23 Claims, 12 Drawing Sheets

FOREIGN PATENT DOCUMENTS

| | | |
|---|---|---|
| JP | 8-268357 A | 10/1996 |
| JP | 4-283034 B2 | 2/1998 |
| JP | 2745841 B * | 10/1998 |
| JP | 2001-157929 A | 6/2001 |
| JP | 2001150251 A * | 6/2001 |
| JP | 2001157929 A * | 6/2001 |
| JP | 2002-236965 A | 8/2002 |
| JP | 2002-263965 A | 9/2002 |

* cited by examiner

WORK LOCATING CONVEYER, WORK LOCATING METHOD, AND WORK LOCATING CONVEYER CARRIAGE

BACKGROUND OF THE INVENTION

1. Field of the Invention

The present invention relates to a work locating conveyer, a work locating method, and a work locating conveyer carriage.

2. Description of the Related Art

Japanese Patent Application Laid-Open No. 2002-263965 (=JP2002263965) discloses a car body conveying device and a method thereof for use in a car body welding line. In the case of a general-purpose conveyer carriage (conveyance track) for carrying various works having different configurations, the location of locating jigs (locator holder) disposed on the conveyer carriage has to be switched for each of the works having different configurations.

A follower switch switches the locations of the locating jigs on the conveyer carriage, for switching vehicle types. The switch which is an outer driven device is provided with an actuator capable of moving in three orthogonal directions, a socket (moved by means of the actuator) and a swing arm. The lowered socket engages a locate pin of the conveyer carriage side, while the swing arm engages a hook pin of the conveyer carriage side.

SUMMARY OF THE INVENTION

It is an object of the present invention to provide a work locating conveyer free from complicated overall structure and control, and to easily locate a locating jig on a conveyer carriage side by using an outer driver.

It is another object of the present invention to provide a work locating method and a work locating conveyer carriage for the above work locating conveyer.

According to a first aspect of the present invention, there is provided a work locating conveyer, comprising: 1) a locator disposed on a conveyer carriage and configured to locate and support a work, the locator including a main locator; 2) a locating jig disposed on the respective locator and configured to locate and support the works having different configurations, the locating jig including a main locating jig, the main locating jig being so set as to move between the following states: i) an in-use state for locating and supporting the work, and ii) a non-use state free from the locating and the supporting of the work; and 3) a driver, including: I) an original position mover configured to move the main locator in such a manner that the main locator follows a moving path on the conveyer carriage to an original position on the moving path, II) a jig returner configured to return the main locating jig to the non-use state, III) a jig locating mover configured to move the main locator from the original position to a certain locating position on the moving path, and IV) a locating jig selective mover configured to move, from the non-use state to the in-use state, the main locating jig that is to be used.

According to a second aspect of the present invention, there is provided a work locating method for locating and supporting a work on a conveyer carriage provided with a locator to thereby convey the work, the locator including a main locator, a locating jig being disposed on the respective locator and configured to locate and support the works having different configurations, the locating jig including a main locating jig, the main locating jig being so set as to move between the following states: i) an in-use state for locating and supporting the work, and ii) a non-use state free from the locating and the supporting of the work, the work locating method by using a driver, comprising: I) moving the main locator in such a manner that the main locator follows a moving path on the conveyer carriage to an original position on the moving path; II) returning the main locating jig to the non-use state; III) moving the main locator from the original position to a certain locating position on the moving path; and IV) moving, from the non-use state to the in-use state, the main locating jig that is to be used, to thereafter position and support the work on the main locator.

According to a third aspect of the present invention, there is provided a work locating conveyer carriage, comprising: 1) a locator configured to locate and support a work, the locator including a main locator, 2) a locating jig disposed on the respective locator, the locating jig being configured to locate and support the works having different configurations, the locating jig including a main locating jig, the main locating jig being so set as to move between the following states: i) an in-use state for locating and supporting the work, and ii) a non-use state free from the locating and the supporting of the work, the work locating conveyer carriage being configured to implement the following operations by using a driver: I) moving the main locator in such a manner that the main locator follows a moving path on the conveyer carriage to an original position on the moving path, II) returning the main locating jig to the non-use state, III) moving the main locator from the original position to a certain locating position on the moving path, and IV) moving, from the non-use state to the in-use state, the main locating jig that is to be used.

The other object(s) and feature(s) of the present invention will become understood from the following description with reference to the accompanying drawings.

DESCRIPTION OF THE PREFERRED EMBODIMENTS

In the following, an embodiment of the present invention will be described in detail with reference to the accompanying drawings.

For ease of understanding, the following description will contain various directional terms, such as left, right, upper, lower, forward, rearward and the like. However, such directional terms are to be understood with respect to only a drawing or drawings on which the corresponding part of element is illustrated.

Figure 1:
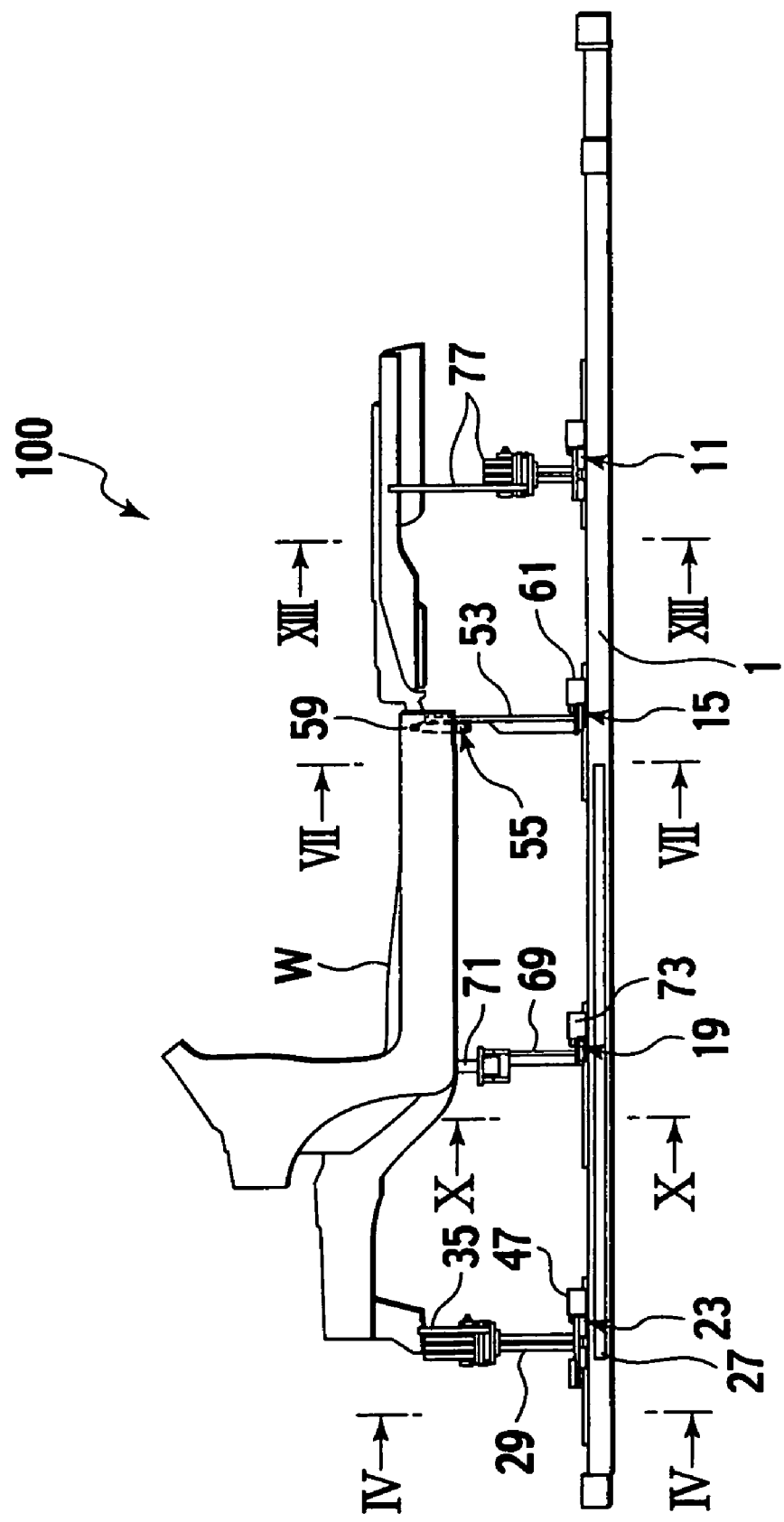
FIG. 1 is a front view of a work locating conveyer, according to an embodiment of the present invention.
Figure 2:
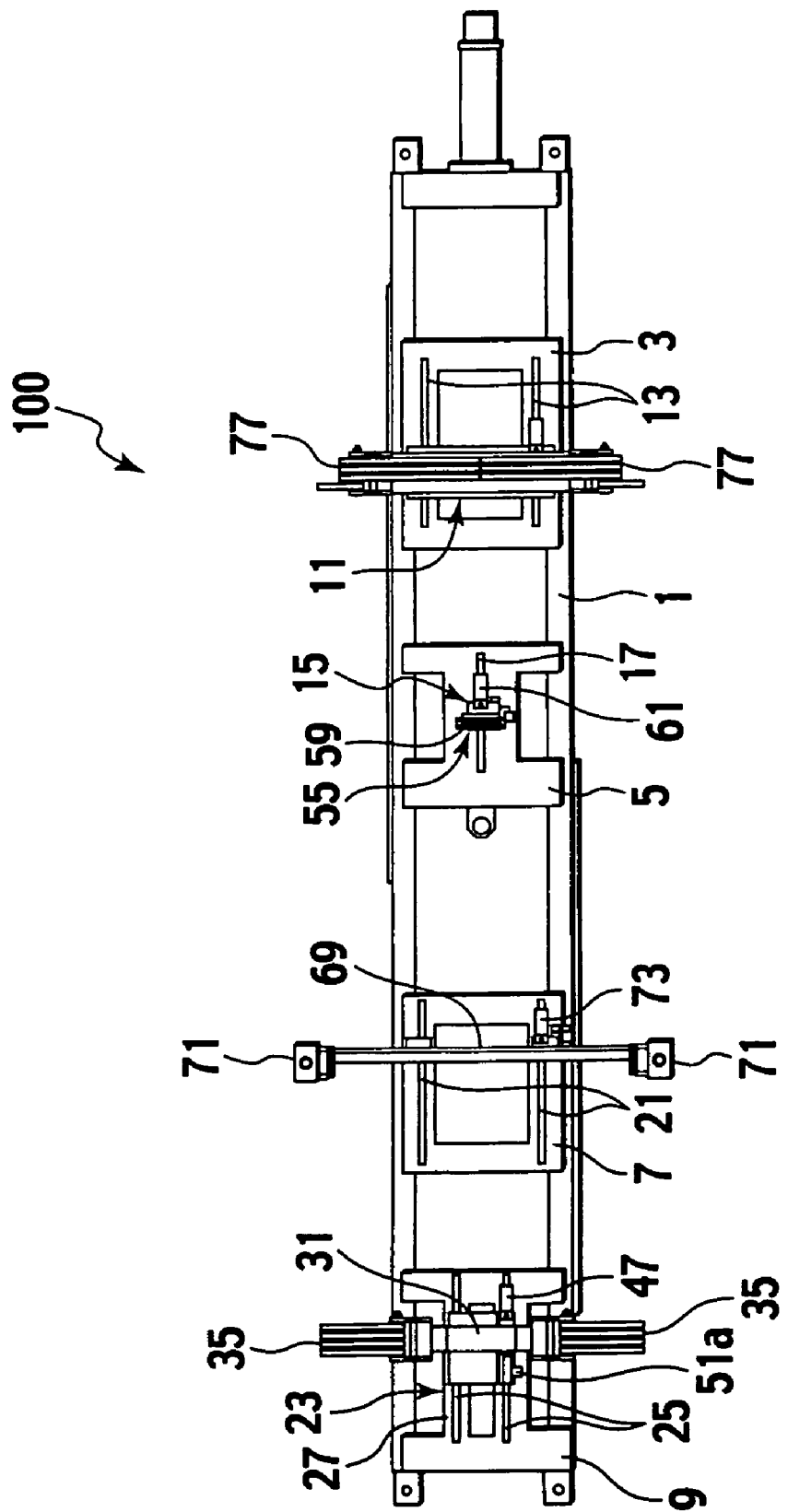
FIG. 2 is a plan view of FIG. 1.

FIG. 1 is a front view of a work locating conveyer 100 and FIG. 2 is a plan view of FIG. 1, according to an embodiment of the present invention.

The work locating conveyer 100 has a body base 1 which is a conveyer carriage 1 extending in a horizontal direction in FIG. 1 and FIG. 2. On the body base 1, there are fixed a first base 3, a second base 5, a third base 7, and a fourth base 9 sequentially from the right side, as referenced in FIG. 2.

On the first base 3, there is disposed a first locator 11 in such a manner as to move on a pair of guide rails 13 extending in the horizontal direction in FIG. 1 and FIG. 2. On the second base 5, there is disposed a second locator 15 in such a manner as to move on one guide rail 17 extending in the horizontal direction in FIG. 1 and FIG. 2. On the third base 7, there is disposed a third locator 19 in such a manner as to move on a pair of guide rails 21 extending in the horizontal direction in FIG. 1 and FIG. 2. On the fourth base 9, there is disposed a fourth locator 23 in such a manner as to move on a pair of guide rails 25 extending in the horizontal direction in FIG. 1 and FIG. 2.

The guide rails 13, 17, 21 and 25 each structure a moving path for allowing one of the respective locators 11, 15, 19 and 23 to follow.

On each of the locators 11, 15, 19 and 23, one of respective locating jigs 77, 55, 71 and 35 (to be described afterward) are to be disposed, thereby locating a work W (body part) on the locating jigs 77, 55, 71 and 35 for operations such as welding of the thus positioned work W. In FIG. 2, however, the work W is not shown (see FIG. 10 for the work W).

Hereinafter described sequentially are details about the fourth locator 23, the second locator 15, the third locator 19 and the first locator 11.

[Fourth Locator 23: Main Locator]

Figure 3:
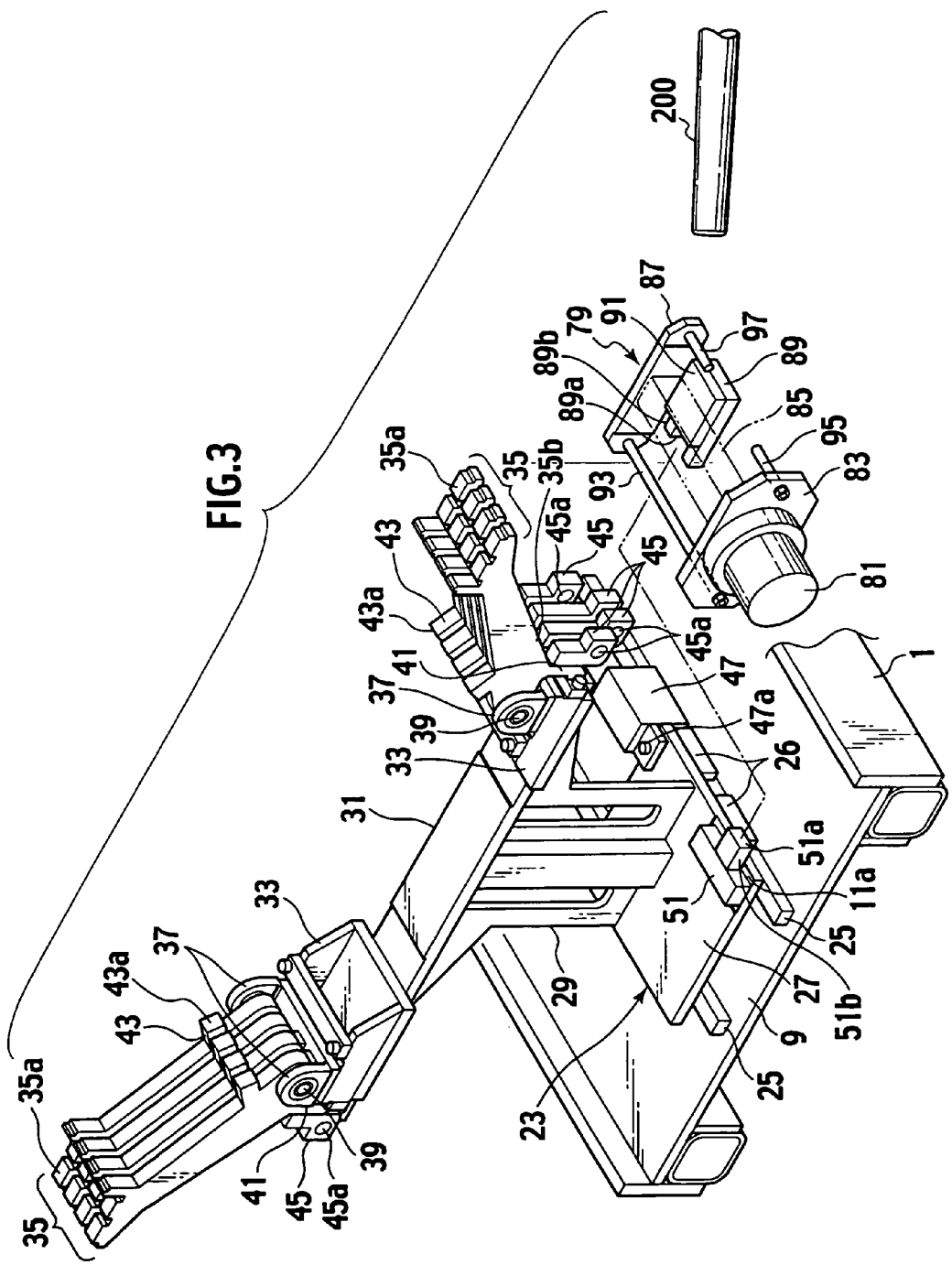
FIG. 3 is a perspective view of a fourth locating jig on a fourth locator.
Figure 4:
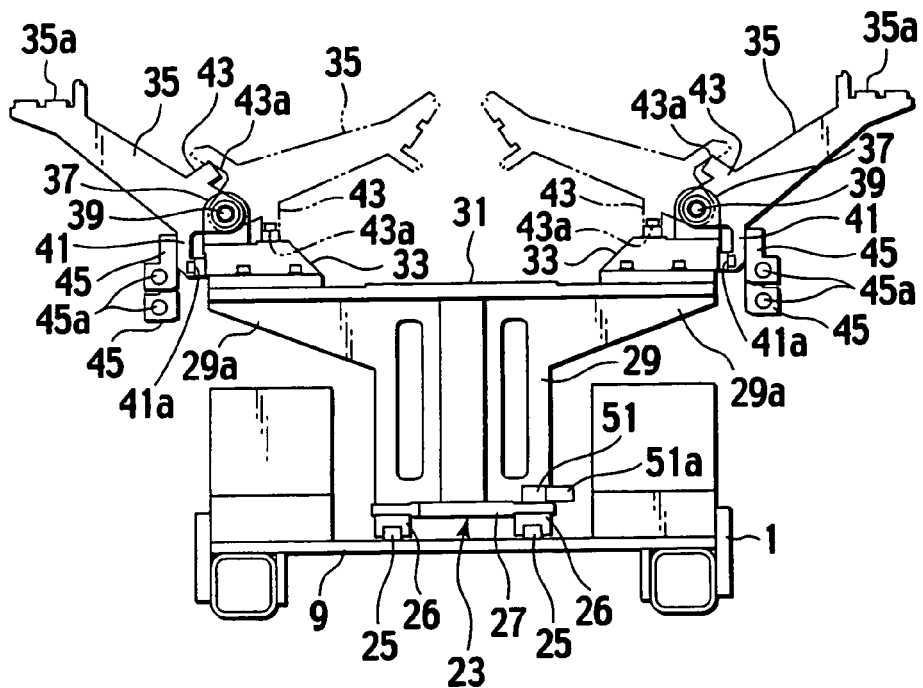
FIG. 4 is an enlarged cross section taken along the lines IV-IV in FIG. 1.
Figure 5:
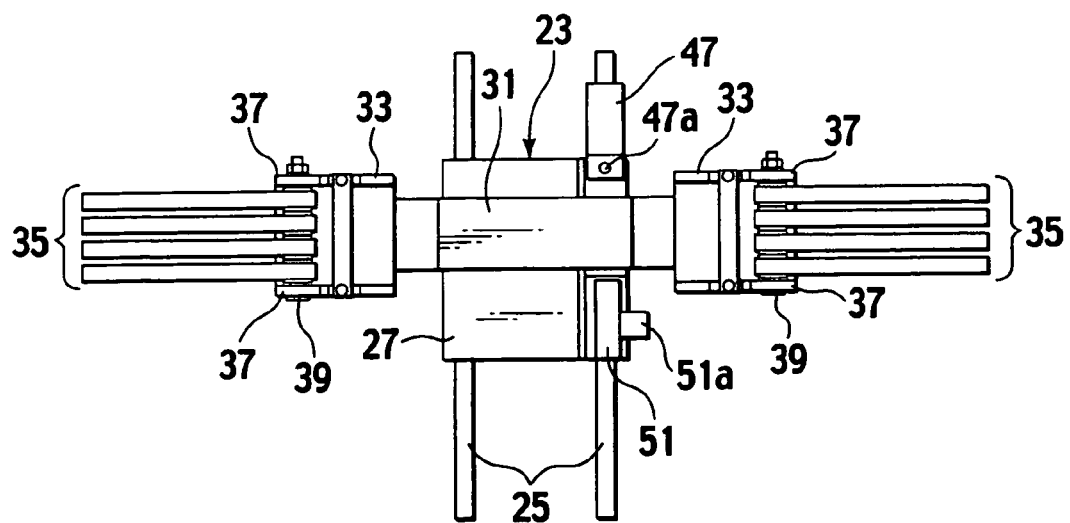
FIG. 5 is a plan view of FIG. 4.
Figure 6:
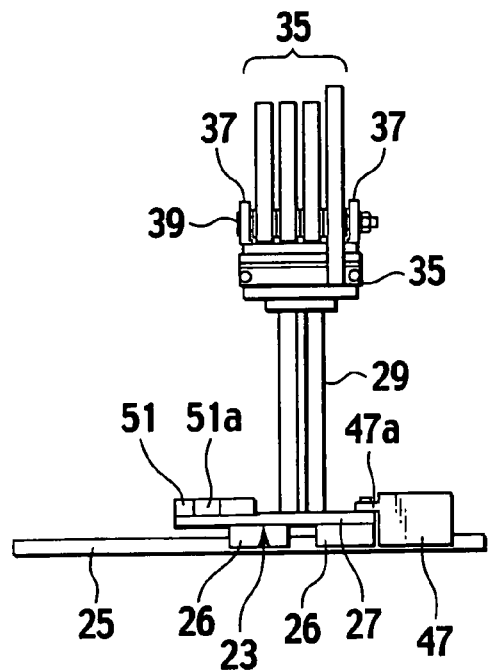
FIG. 6 is a right side view of FIG. 4.

FIG. 3 is a perspective view of a fourth locating jig 35 (main locating jig) on the fourth locator 23, FIG. 4 is an enlarged cross section taken along the lines IV-IV in FIG. 1, FIG. 5 is a plan view of FIG. 4, and FIG. 6 is a right side view of FIG. 4. The fourth locator 23 is provided with a guided portion 26 movably guided by a guide rail 25, and a bench plate 27 fixed on the guided portion 26.

There is provided a jig supporting bracket 29 standing on the bench plate 27. There is provided a jig supporting plate 31 on an upper arm portion 29a (of the jig supporting bracket 29) extending horizontally on both right and left sides in FIG. 4.

In FIG. 4, a fixture 33 is fixed to each of right and left ends on the jig supporting plate 31. A plurality of the fourth locating jigs 35 are fitted to the fixture 33. The fixture 33 is provided with a pair of fitting flanges 37 extending upward. A supporting shaft 39 supported by the pair of the fitting flanges 37 connects to a first end of the fourth locating jig 35, thereby making the thus connected fourth locating jig 35 pivotal.

Each of the plurality of the fourth locating jigs 35 is individually pivotal around the supporting shaft 39, and as shown in FIG. 4, makes a displacement between i) an in-use state (positioning and supporting the work W) indicated by an actual line and ii) a non-use state (not positioning or supporting the work W) indicated by a 2-point chain line. An upper end of the fourth locating jig 35 in the in-use state is formed with a locating portion 35a for locating and supporting the work W.

In addition, in the vicinity of the supporting shaft 39, each of the fourth locating jigs 35 is provided with a stopper 41 which protrudes downward in the in-use state. The in-use state can be secured, when a stopper face 41a on the fixture 33 side of the stopper 41 abuts on a side face of the mixture 33.

In addition, in the vicinity of the supporting shaft 39, each of the fourth locating jigs 35 is provided with a stopper 43 which protrudes downward in the non-use state. The non-use state can be secured, when a stopper face 43a on the fixture 33 side of the stopper 43 abuts on an upper face of the fixture 33. Hereinabove, between i) the stopper face 43a of the stopper 43 and ii) the upper face (abutting on the stopper face 43a) of the fixture 33, there is interposed a shock-absorbing material (not shown) such as urethane.

For each of the fourth locating jigs 35, there is provided a jig raising piece 45 on an opposite side to the stopper face 41a of the stopper 41. The jig raising piece 45 is formed with a jig raising hole 45a which is a holding hole (through hole) extending in the direction along the guide rail 25. As shown in FIG. 3, the two center downward jig raising pieces 45 are longer than the other two side downward jig raising pieces 45. With this, as shown in FIG. 4, the two center jig raising holes 45a are disposed lower than the two side jig raising holes 45a, thus making an offset upward and downward from each other when the jig raising holes 45a are viewed from the direction of conveying the work W.

To an end of the fourth locator 23 on a back side of FIG. 4, an air locker 47 is fixed via a fitting portion 47a thereof (see FIG. 4 and FIG. 5). The air locker 47 can move along the guide rail 25 integrally with the fourth locator 23. In a certain locating position of the fourth locator 23, a pressing piece (not shown) in the air locker 47 presses the guide rail 25 by means of air pressure, thus locking the fourth locator 23.

On an end of the fourth locator 23 on a front side of FIG. 4, there is formed a cutout 11a (see FIG. 3). An engaged block 51 is fixed to the cutout 11a. The engaged block 51 is formed with a protrusion 51a which is a held portion protruding outward relative to the guide rail 25.

[Second Locator 15: Sub-Locator]

Figure 7:
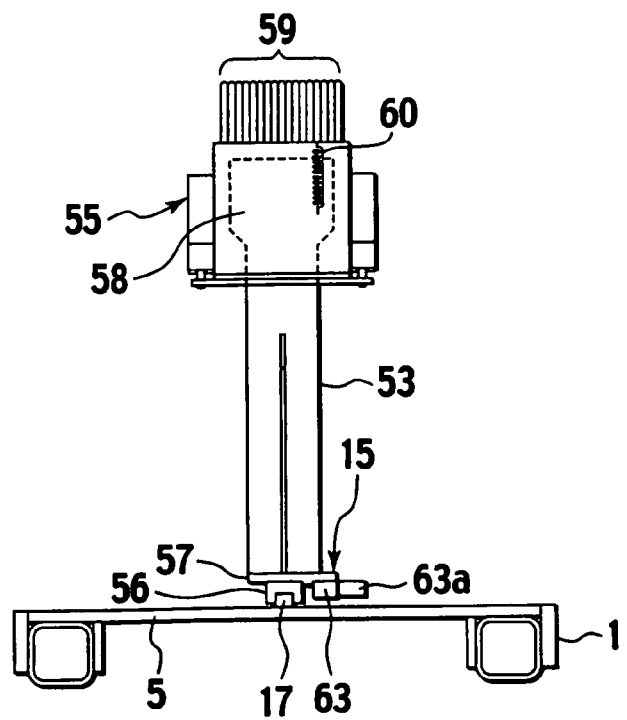
FIG. 7 is an enlarged cross section taken along the lines VII-VII in FIG. 1.
Figure 8:
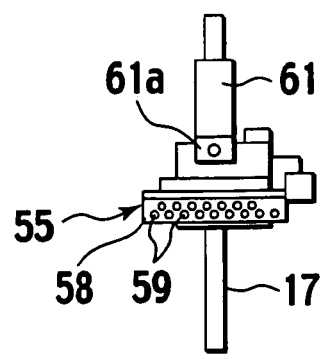
FIG. 8 is a plan view of FIG. 7.
Figure 9:
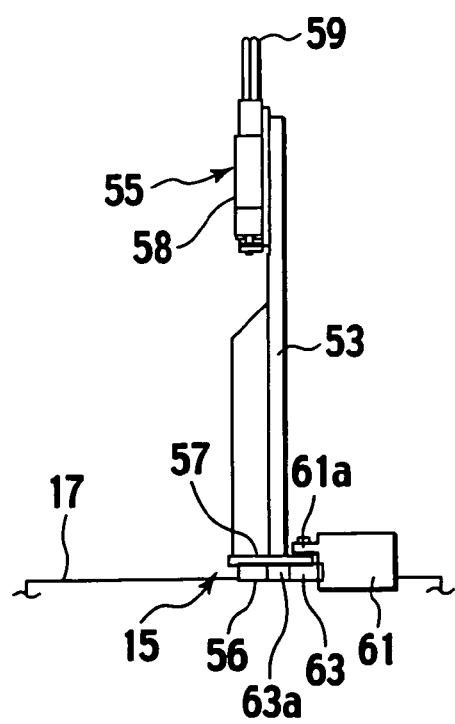
FIG. 9 is a right side view of FIG. 7.

FIG. 7 is an enlarged cross section taken along the lines VII-VII in FIG. 1, FIG. 8 is a plan view of FIG. 7, and FIG. 9 is a right side view of FIG. 7. A jig supporting bracket 53 stands on the second locator 15. The jig supporting bracket 53 has an upper end side provided with a second locating jig 55 (sub-locating jig) for receiving the work W in the downward position.

The second locator 15 is provided with: i) a guided portion 56 movably guided by the guide rail 17 and ii) a bench plate 57 fixed on the guided portion 56.

The second locating jig 55 has a support pin holder 58 fixed to the jig supporting bracket 53. The support pin holder 58 is provided with a plurality of support pins 59 protruding upward in form of a needle (or frog, brush). Under each of the support pins 59, there is provided a spring 60 which resiliently supports via the support pins 59 the work W in such a manner that the support pin 59 is moved downward when abutted by a lower face of the work W. The above spring 60 is received in the support pin holder 58.

To an end of the second locator 15 on a back side of FIG. 7, there is fixed an air locker 61 via a fitting portion 61a thereof (see FIG. 8). Like the air locker 47 in FIG. 3 and FIG. 5, the air locker 61 in FIG. 8 can move along the guide rail 17 integrally with the second locator 15. In a certain locating position of the second locator 15, a pressing piece (not shown) in the air locker 61 presses the guide rail 17 by means of air pressure, thus locking the second locator 15.

An engaged block 63 is fixed to a lower end face on the right side of the second locator 15 in FIG. 7. The engaged block 63 is formed with a protrusion 63a (held portion) protruding outward relative to the guide rail 17.

[Third Locator 19: Sub-Locator]

Figure 10:
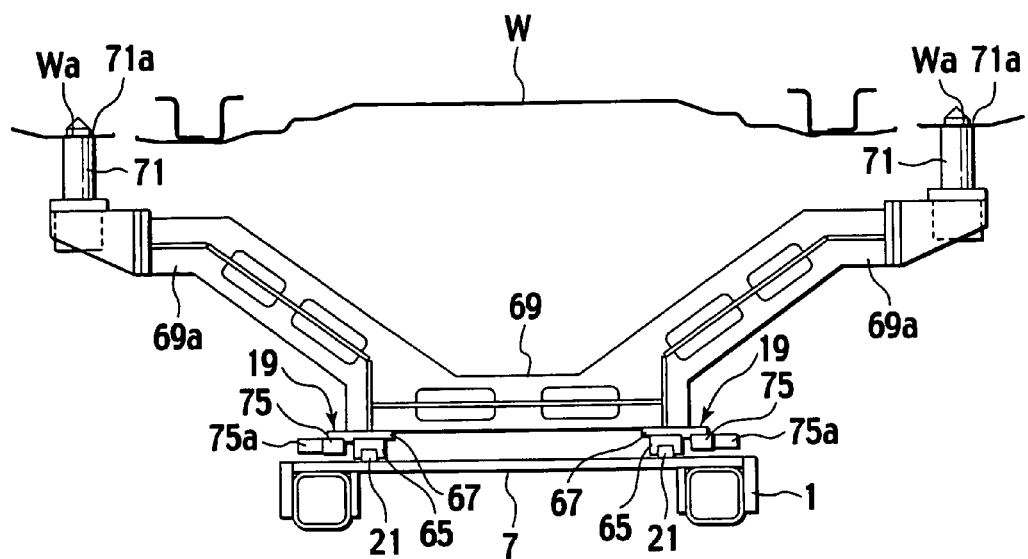
FIG. 10 is an enlarged cross section taken along the lines X-X in FIG. 1.
Figure 11:
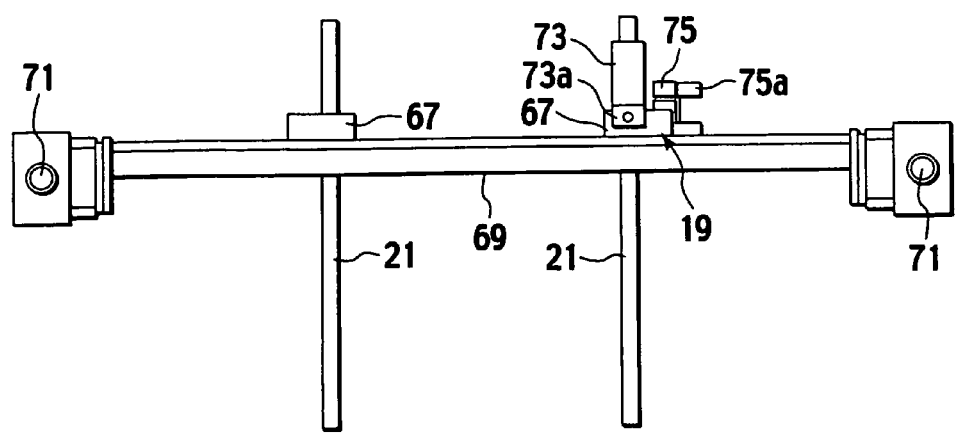
FIG. 11 is a plan view of FIG. 10.
Figure 12:
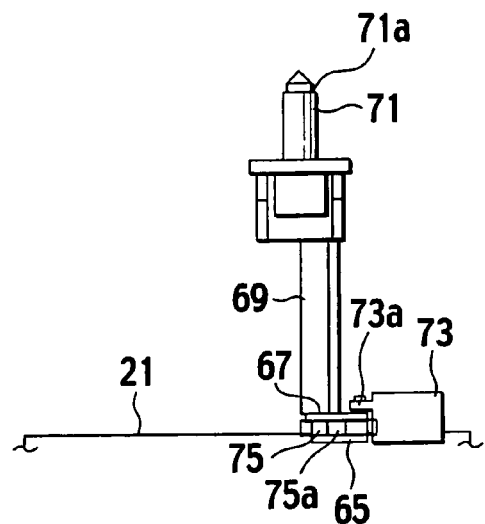
FIG. 12 is a right side view of FIG. 10.

FIG. 10 is an enlarged cross section taken along the lines X-X in FIG. 1, FIG. 11 is a plan view of FIG. 10, and FIG. 12 is a right side view of FIG. 10. On right and left sides in FIG. 10, there are provided a pair of the third locators 19 each of which is provided with a guided portion 65 movably guided by a guide rail 21 and a bench plate 67 fixed on the guided portion 65. In FIG. 10, a jig supporting bracket 69 stands on the bench plate 67, where arm portions 69a each extends horizontally from an upper part of the jig supporting bracket 69. On an upper face at a head end of the arm portion 69a, there is provided a third locating jig 71 (sub-locating jig) which is a locating pin.

Inserting a head end of the third locating jig 71 into a locating hole Wa of the work W and putting the work W on a stage portion 71a of the third locating jig 71 can implement the locating operation in upper-lower direction. The locating position in the upper-lower direction serves as a reference position of the work W.

To an end of the third locator 19 on a back side of FIG. 10, an air locker 73 is fixed via a fitting portion 73a thereof (see FIG. 11). Like the air locker 47 in FIG. 3 and FIG. 5, the air locker 73 in FIG. 11 can move along the guide rail 21 integrally with the third locator 19. In a certain locating position of the third locator 19, a pressing piece (not shown) in the air locker 73 presses the guide rail 21 by means of air pressure, thus locking the third locator 19.

On a lower end face on the right side (likewise, on the left side) of the third locator 19 in FIG. 10, there is formed a protrusion 75a (held portion) protruding outward relative to the guide rail 21.

[First Locator 11: Main Locator]

Figure 13:
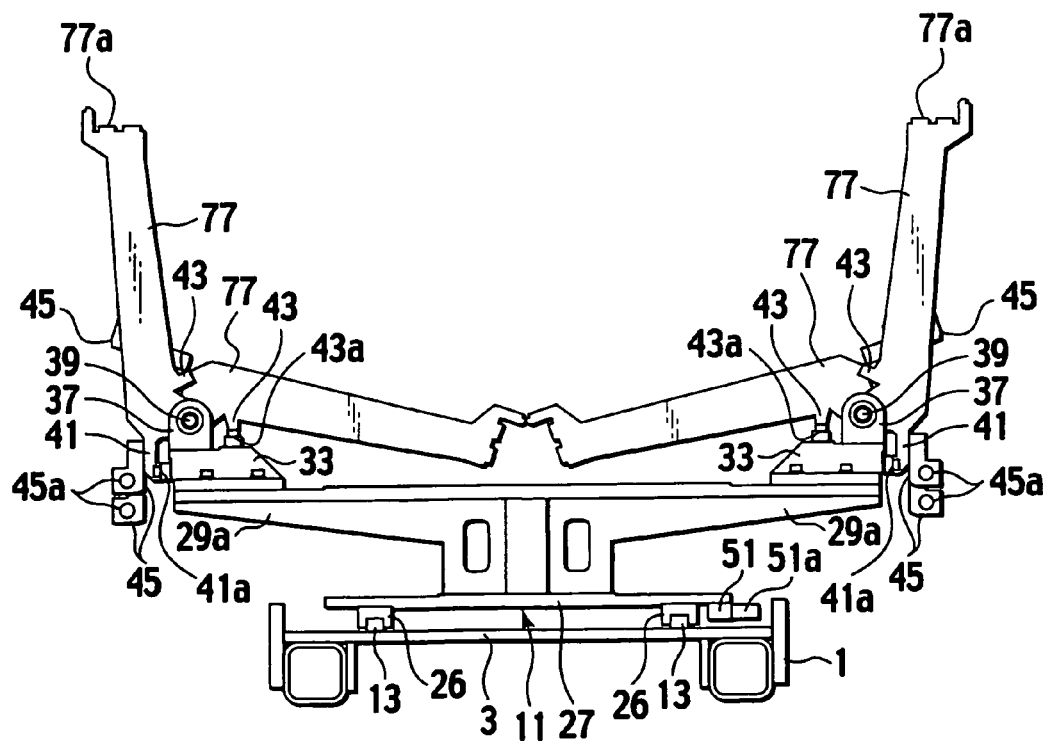
FIG. 13 is an enlarged cross section taken along the lines XIII-XIII in FIG. 1.
Figure 14:
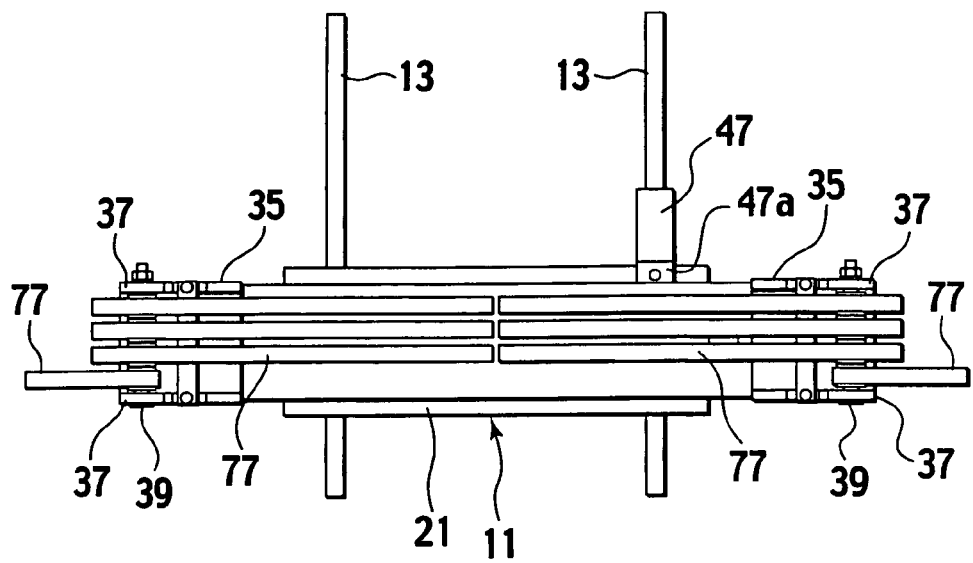
FIG. 14 is a plan view of FIG. 13.
Figure 15:
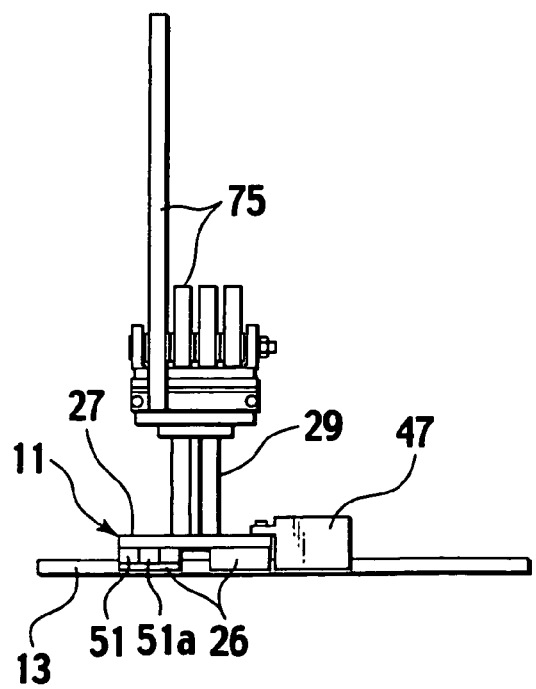
FIG. 15 is a right side view of FIG. 14.

FIG. 13 is an enlarged cross section taken along the lines XIII-XIII in FIG. 1, showing a first locating jig 77 (main locating jig) of the first locator 11, FIG. 14 is a plan view of FIG. 13, and FIG. 15 is a right side view of FIG. 14. The first locating jig 77 is, in general, longer than the fourth locating jig 35 in FIG. 3 to FIG. 6, and has a head end provided with a locating portion 77a for receiving the work W.

Other structural elements of the first locator 11 and the first locating jig 77 in FIG. 13 to FIG. 15 are like those of the fourth locator 23 and the fourth locating jig 35 in FIG. 4 to FIG. 6, therefore omitting repeated descriptions of the elements having the same reference numerals.

[Outer Driver 79]

Hereinafter described is an outer driver 79 shown in FIG. 3. From an outer part of the work locating conveyer 100, the outer driver 79 moves the locators 11, 15, 19 and 23, and turns the first locating jig 77 and the fourth locating jig 35 around the supporting shaft 39.

Figure 16:
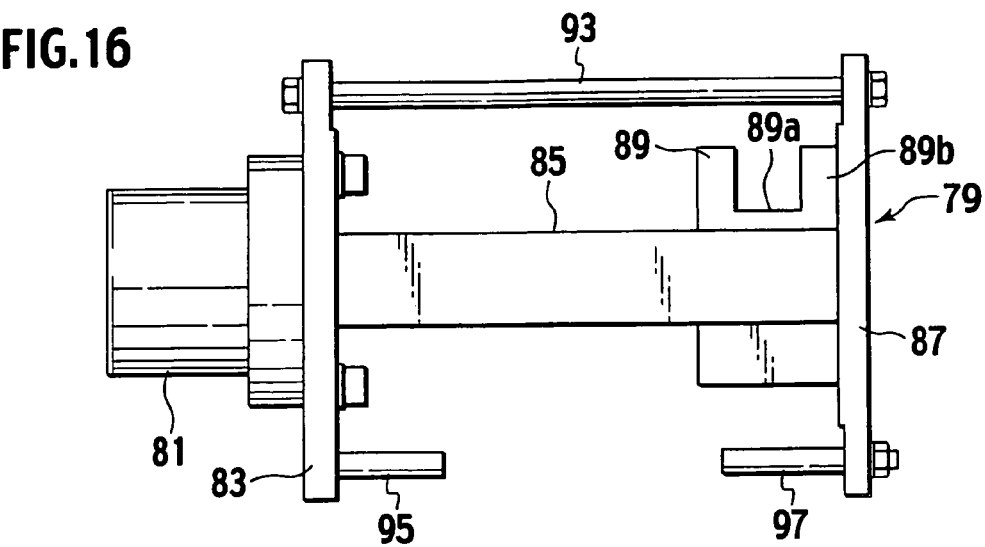
FIG. 16 is a plan view of an outer driver.

The outer driver 79 is an outer driver fitted to a head end of a robot arm 200 via a fitting portion 81. FIG. 16 is a plan view of the outer driver 79, FIG. 17 is a plan view of FIG. 16, and FIG. 18 is a left side view of FIG. 16.

The outer driver 79 has the fitting portion 81 to which a base plate 83 is fixed, and is provided, on the other end of a connecting rod 85, with an end plate 87 on an opposite side to the base plate 83. On a lower face of the end plate 87 and below the connecting rod 85 in FIG. 3, there is provided an operation piece 89 for moving the locators 11, 15, 19 and 23 along the respective guide rails 13, 17, 21 and 25.

Figure 17:
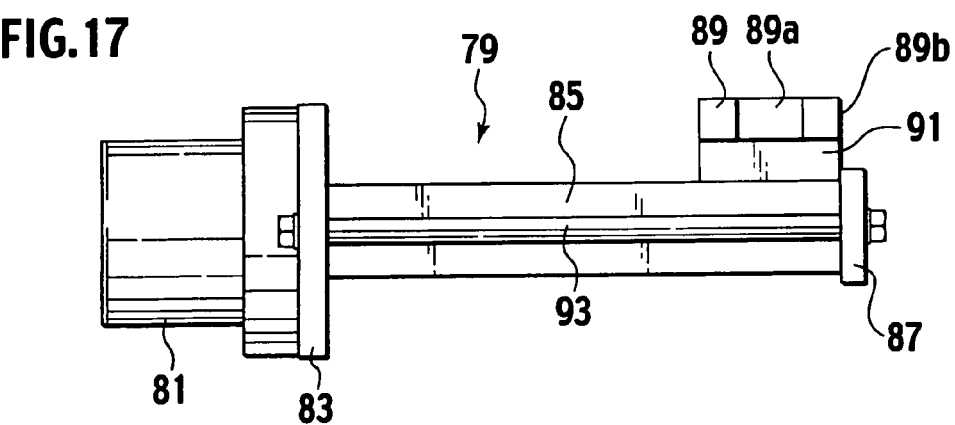
FIG. 17 is a plan view of FIG. 16.
Figure 18:
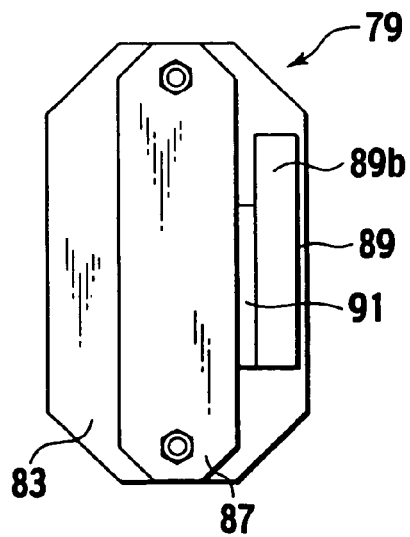
FIG. 18 is a left side view of FIG. 16.

The operation piece 89 is, as shown in FIG. 17 and FIG. 18, fitted to the connecting rod 85 via a fitting piece 91, thereby protruding more upward in FIG. 17 than the end plate 87 and more rightward than the end plate 87 in FIG. 18.

In FIG. 16, an upper end of the operation piece 89 is formed with a dent portion 89a which serves as a holder for sandwiching and holding the protrusions 51a, 63a, 75a and 51a of the respective locators 11, 15, 19 and 23. With the protrusions 51a, 63a, 75a and 51a each inserted in the dent portion 89a, moving the outer driver 79 along one of the respective guide rails 13, 17, 21 and 25 can move one of the respective locators 11, 15, 19 and 23 to a certain locating position.

In FIG. 16, on right side of the dent portion 89a of the operation piece 89, there is provided a pressing portion 89b for moving the locators 11, 15, 19 and 23 in the forward direction by pressing side faces of the protrusions 51a, 63a, 75a and 51a of the respective locators 11, 15, 19 and 23. Through the above pressing operation, each of the locators 11, 15, 19 and 23 can move to an original position on the guide rails 13, 17, 21 and 25.

Summarizing the above, the pressing portion 89b moves the locators 11, 15, 19 and 23 to the original position on the moving paths (guide rails 13, 17, 21 and 25). In addition, the dent portion 89a moves the locators 11, 15, 19 and 23 from the original position to the certain locating position on the moving paths (guide rails 13, 17, 21 and 25).

In addition, as shown in FIG. 16, the outer driver 79 is provided with a pressing rod 93 which connects the base plate 83 to the end plate 87, in an upper position of the connecting rod 85. The pressing rod 93 (jig returner) of the outer driver 79 in the state shown FIG. 3 presses, for example, the pressed portions 35b (four in number) of the fourth locating jigs 35 (four in number) in the position in FIG. 3, returning all at once the fourth locating jigs 35 (four in number) to the non-use state indicated by 2-point chain line in FIG. 4.

In addition, as shown in FIG. 16, on the faces where the base plate 83 and the end plate 87 oppose each other in the lower side of the connecting rod 85, the outer driver 79 is provided respectively with an insert pin 95 and an insert pin 97 protruding in opposite directions to each other.

Each of the insert pin 95 and the insert pin 97 is to be inserted into one to-be-used jig raising hole 45a of the fourth locating jigs 35 (four in number), thereby moving the fourth locating jigs 35 from the non-use state (indicated by the 2-point chain line in FIG. 4) to the in-use state (indicated by the actual line in FIG. 4), serving as a locating jig selective mover.

The insert pin 95 corresponds to two fourth locating jigs 35 on a first side, while the insert pin 97 corresponds to another two fourth locating jigs 35 on a second side.

In addition, the pressing rod 93, the insert pin 95 and the insert pin 97, likewise, operate the first locating jig 77 in FIG. 13 to FIG. 15.

[Operation]

Hereinafter described is operation of the work locating conveyer 100 and the work locating conveyer carriage 1.

Described at first is operation of locating the fourth locating jig 35 on the fourth locator 23, as shown in FIG. 3. In accordance with a teaching of the robot (robot arm 200), the outer driver 79 moves toward the fourth locator 23. Then, the pressed face 51b of the protrusion 51a of the engaged block 51 on the fourth locator 23 side is pressed toward the air locker 47 side by means of the pressing portion 89b of the operation piece 89, to thereby move the fourth locator 23 to the original position along the guide rail 25.

In this case, all the four fourth locating jigs 35 on each of right and left sides, as shown in FIG. 3, are in the in-use state. Alternatively however, at least one of the four fourth locating jigs 35 used before may be in the in-use state on each of right and left sides.

From this state, the outer driver 79 is to be moved in such a manner that the pressing rod 93 presses the pressed portion 35b of the fourth locating jig 35 in a proper direction. Then, from the in-use state, all the fourth locating jigs 35 are pivoted around the supporting shaft 39 extending in the direction along the guide rail 25, to thereby reach the non-use state indicated by 2-point chain line in FIG. 4. With this, as shown FIG. 19, all the four fourth locating jigs 35 arranged on each of right and left sides are in the non-use state.

Then, the outer driver 79 is separated from the fourth locating jig 35. Then, the operation piece 89 is moved toward a lower part of the fourth locator 23, to thereby allow the dent portion 89a of the operation piece 89 to engageably sandwich the protrusion 51a of the fourth locator 23. In this state, the outer driver 79 is so moved as to move the fourth locator 23 along the guide rail 25 in a direction away from the original position to the certain locating position.

Figure 19:
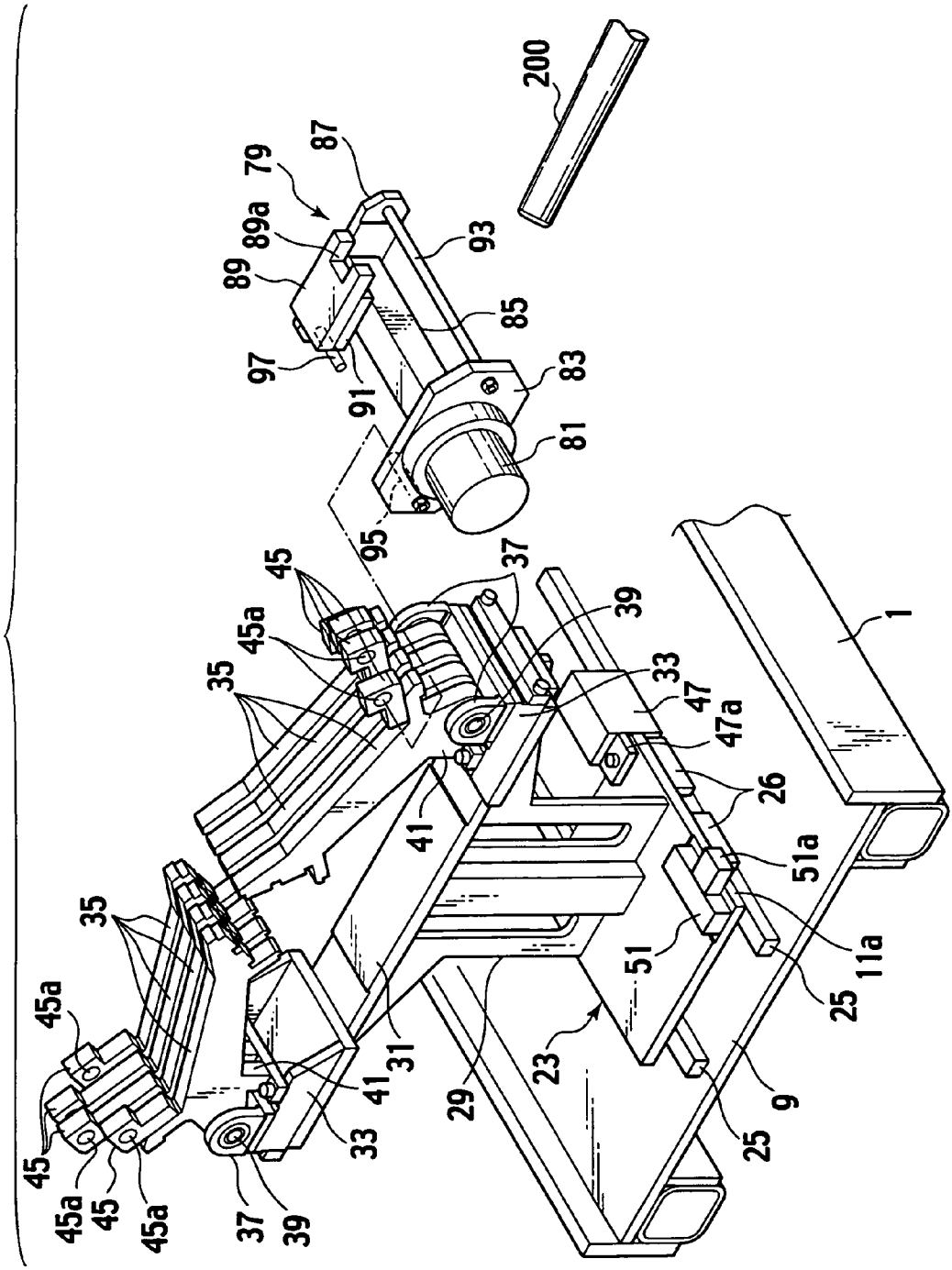
FIG. 19 shows an operation in which all the four fourth locating jigs arranged on each of right and left sides are in the non-use state.
Figure 20:
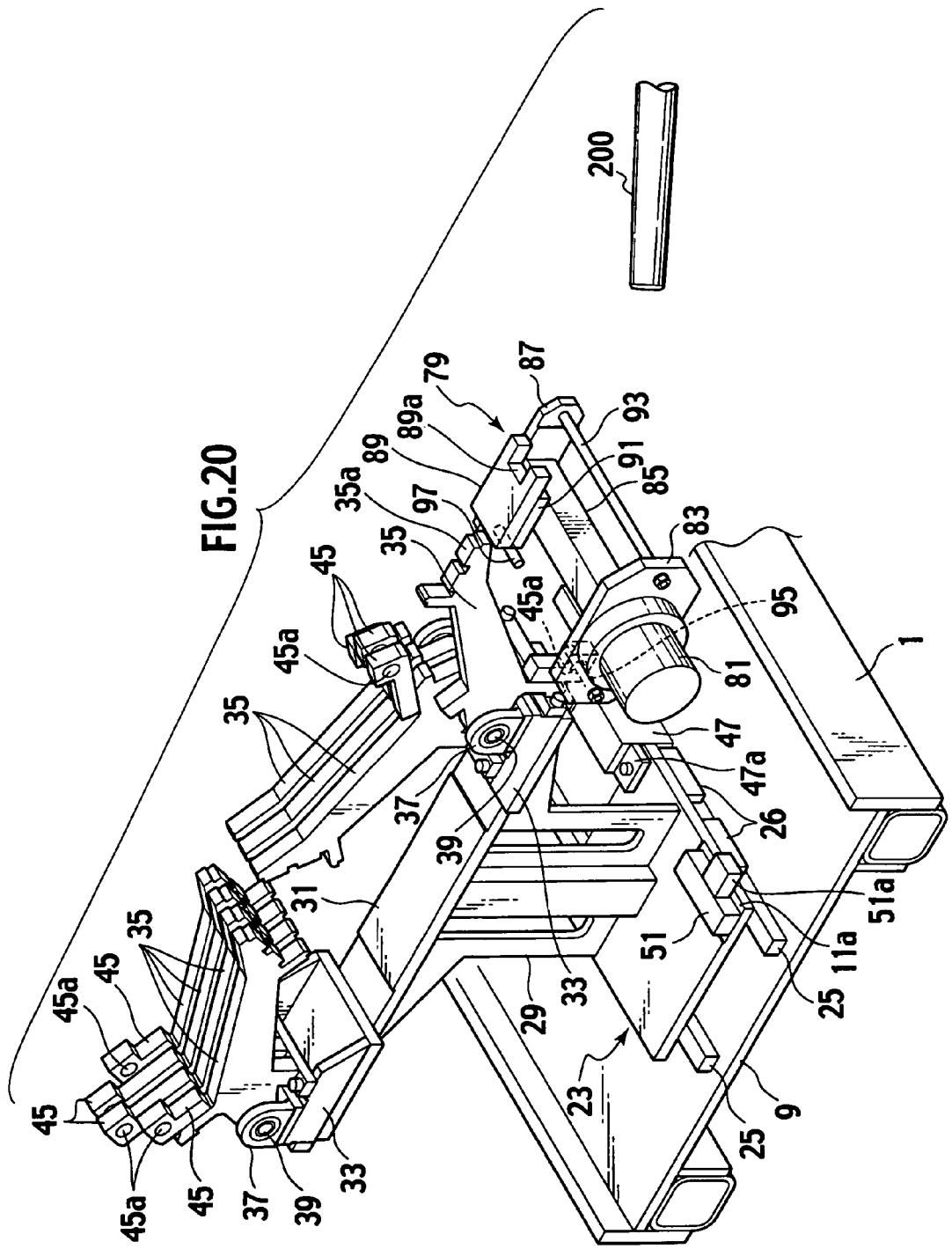
FIG. 20 shows an operation in which the to-be-used fourth locating jig is alone raised for the in-use state.

Then, the outer driver 79 is detached from the fourth locator 23. In a position properly spaced apart from the fourth locator 23, as shown in FIG. 19, the outer driver 79 is pivoted by 180° around a shaft center of the connecting rod 85 extending in the longitudinal direction. Then, from this state in FIG. 19, the insert pin 95 is inserted into the jig raising hole 45a of the jig raising piece 45 of one of the fourth locating jigs 35 that is to be used. Then, as shown in FIG. 20, the to-be-used fourth locating jig 35 is alone raised for the in-use state. Like operations are to be implemented for one of the fourth locating jigs 35 on the opposite side.

In this case, the outer diameter of each of the insert pin 95 and the insert pin 97 is smaller than the inner diameter of the jig raising hole 45a, forming a certain gap therebetween. In this case however, the fourth locating jig 35 is to be raised smoothly, without causing a play by the insert pin 95 and the insert pin 97 in the jig raising hole 45a.

In addition, the two middle jig raising holes 45a are offset from the two side jig raising holes 45a, thereby the insert pin 95 and the insert pin 97 each can be preferably inserted into only the jig raising hole 45a that is to be used for the current raising operation. Otherwise, all the four jig raising holes 45a can be offset differently, allowing only one insert pin 95 or 97 to be used for the raising operation.

As described above, the locating operation of the fourth locator 23 and the fourth locating jig 35 is thus ended. This locating operation is to be likewise implemented for the fist locator 11 and the first locating jig 77. Specifically, the following operations are to be implemented:

Operation I) moving the first locator 11 to the original position,

Operation II) moving, to the non-use state, all the four first locating jigs 77 on each of right and left sides, Operation III) moving the first locator 11 to the certain locating position, and Operation IV) moving, to the in-use state, the one to-be-used first locating jig 77 on each of the right and left sides.

In addition, operations like those for the first locator 11 (or the fourth locator 23) are to be implemented for the second locator 15 and the third locator 19. Specifically, moving the second locator 15 and the third locator 19 to the original position {operation I) in the former paragraph} and moving the second locator 15 and the third locator 19 to the certain locating position {operation III) in the former paragraph}.

With the above operations, each of the locators 11, 15, 19 and 23 is moved to the certain locating position, and the first locating jig 77 and the fourth locating jig 35 are set in the in-use state, to thereby set the work W on the locating jigs 77, 55, 71 and 35, as shown in FIG. 1.

After the setting, the third locating jig 71 which is a locating pin for the third locator 19 specifies the upper-lower position of the work W, as shown in FIG. 10. In addition, according to the configuration of a lower face of the work W, a plurality of the support pins 59 of the second locator 15 resiliently support the work W by means of the spring 60, suppressing deformation of the work W. Then, with this locating set, the work W is, for example, subjected to the welding.

According to the embodiment of the present invention, the outer driver 79 which is the outer driver 79 moved by the teaching of the robot (robot arm 200) is provided with the following integrated members:

I) the pressing portion 89b of the operation piece 89 for pressing each of the locators 11, 15, 19 and 23 to the original position, II) the pressing rod 93 for returning at once the four fourth locating jigs 35 (four first locating jigs 77) to the non-use state, III) the dent portion 89a of the operation piece 89 for moving each of the locators 11, 15, 19 and 23 from the original position to the certain locating position, and IV) the insert pin 95 and the insert pin 97 for moving from the non-use state to the in-use state the fourth locating jig 35 (first locating jig 77) that is to be used.

The above structure of the outer driver 79 can eliminate the need for an actuator which has crossing three axes for operation freedom. Therefore, the work locating conveyer 100 and the work locating conveyer carriage 1 can prevent complicated overall structure and control; and can easily locate, by using the outer driver 79, the locating jig disposed on the locator (11, 15, 19, 23) side.

In addition, simply pressing each of the locators 11, 15, 19 and 23 by means of the pressing portion 89b of the outer driver 79 can once move the locators 11, 15, 19 and 23 to the original position, before moving each of the locators 11, 15, 19 and 23 to the certain locating position by means of the dent portion 89a. With the above movement, the locators 11, 15, 19 and 23 are not necessarily on certain positions on the respective guide rails 13, 17, 21 and 25, eliminating the need for receiving position information of the locators 11, 15, 19 and 23 before switching the vehicle types, resulting in easy and short-time locating operation.

This application is based on a prior Japanese Patent Application No. P2004-378102 (filed on Dec. 27, 2004 in Japan). The entire contents of the Japanese Patent Application No. P2004-378102 from which priority is claimed are incorporated herein by reference, in order to take some protection against translation errors or omitted portions.

Although the present invention has been described above by reference to a certain embodiment, the present invention is not limited to the embodiment described above. Modifications and variations of the embodiment described above will occur to those skilled in the art, in light of the above teachings.

Specifically, according to the embodiment, returning each of the fourth locating jigs 35 to the non-use state indicated by the 2-point chain line in FIG. 4 is implemented when the fourth locator 23 is in the original position. The present invention is, however, not limited to this. The returning may be implemented when the fourth locator 23 is in the certain locating position. In addition, raising to the in-use state (indicated by the actual line in FIG. 4) the one fourth locating jig 35 that is to be used for the current operation can be implemented in the original position, like the returning of the fourth locating jig 35 to the non-use state being implemented in the original position.

In addition, when the second locating jig 55 in FIG. 7 to FIG. 9 is not provided with the support pin 59 having the spring 60, a supporting member abutting on the lower face of the work W is to be used for supporting the work W. In this case, however, the supporting member is not to be fixed to the jig supporting bracket 53, but is made slidable along a guide rail in the upper-lower direction, with an air locker provided for locking the sliding movement.

The second locating jig 55 provided with the above supporting member is to be held by an operation piece (which is to be provided, for example, on a face opposite to the connecting rod 85 side of the end plate 87) formed with a dent portion like the dent portion 89a of the operation piece 89, to thereby properly position the second locating jig 55 by the upper-lower movement.

In addition, the third locating jig 71 in FIG. 10 to FIG. 12 may be provided with a clamp mechanism for clamping the work W from upper and lower sides.

Moving merely along the guide rail 21 in the forward-backward direction of the work W, the above third locating jig 71 can have a simple structure. In addition, for moving the third locating jig 71 in the width direction or the upper-lower direction of the work W, guide rails extending in the respective directions and air lockers are to be provided, like the supporting member which is used when the support pin 59 is not provided for the second locating jig 55, as described in the former two paragraphs. With this, the third locating jig 71 is to be moved to be certain position by means of the outer driver 79.

The scope of the present invention is defined with reference to the following claims.

What is claimed is:

1. A work locating conveyor, comprising:
   a conveyor carriage including:
      a locator disposed on the conveyor carriage and configured to locate and support a work, the locator serving as a main locator;
      a locating jig disposed on the locator and configured to locate and support the work having different configurations, the locating jig serving as a main locating jig,
      wherein the main locating jig is configured to move between the following states:
      an in-use state for locating and supporting the work, and
      a non-use state free from the locating and the supporting of the work; and an outer driver, including:
         an original position mover configured to move the main locator in such a manner that the main locator follows a moving path on the conveyor carriage to an original position on the moving path,
      a jig returner configured to return the main locating jig to the non-use state,
      a jig locating mover configured to move the main locator from the original position to a certain locating position on the moving path, and
      a locating jig selective mover configured to move the main locating jig from the non-use state to the in-use state,
   wherein the outer driver is configured to move the main locator from an outer part of the work locating conveyor,
   wherein the original position mover includes a pressing portion configured to press the main locator in a forward moving direction.

2. The work locating conveyor as claimed in claim 1, wherein:
   the main locating jig is pivotal around a supporting shaft extending in a direction along the moving path as to move between the in-use state and the non-use state, and
   the jig returner presses the main locating jig, to thereby pivot the main locating jig around the supporting shaft.

3. The work locating conveyor according to claim 2, wherein the outer driver is configured to turn the main locating jig around the supporting shaft from the outer part of the work locating conveyor.

4. The work locating conveyor as claimed in claim 1, wherein the jig locating mover includes a holder configured to hold and move a held portion formed on the main locator.

5. The work locating conveyor as claimed in claim 1, wherein the locating jig selective mover includes an insert pin to be inserted into a holding hole of the main locating jig in a direction along the moving path.

6. The work locating conveyor according to claim 5, wherein the outer driver has a base plate and an end plate oppositely connected to the base plate via a connecting rod which connects substantially a center of the base plate with substantially a center of the end plate, and the insert pin includes:
   a first pin protruding from the base plate; and
   a second insert pin protruding from the end plate to oppose the first insert pin.

7. The work locating conveyor as claimed in claim 1, wherein the jig returner includes a pressing rod configured to return the main locating jig to the non-use state by pressing a pressed portion of the main locating jig.

8. The work locating conveyor as claimed in claim 1, wherein the outer driver is disposed at a head end of a robot arm.

9. The work locating conveyor as claimed in claim 1, further comprising a sub-locator following a moving path on the conveyor carriage, wherein:
   the sub-locator has a receiving jig configured to receive the work from a downward position, and
   the receiving jig has a resilient member which is deformed with a load of the work applied to the resilient member.

10. The work locating conveyor as claimed in claim 1, wherein:
    the work locating conveyor includes a plurality of locating jigs, and
    the jig returner is configured to return all of the locating jigs to the non-use state.

11. The work locating conveyor according to claim 1, wherein there is one and only one outer driver.

12. The work locating conveyor according to claim 1, wherein the outer driver includes the following as integrated members:
    the original position mover,
    the jig returner,
    the jig locating mover, and
    the locating jig selective mover.

13. The work locating conveyor as claimed in claim 1, wherein the outer driver is spaced apart from the locator and the locating jig in the non-use state.

14. The work locating conveyor as claimed in claim 1, wherein the outer driver is not connected to the conveyor carriage when the outer driver is not in use.

15. A work locating method for locating and supporting a work on a conveyor carriage provided with a locator to thereby convey the work, the locator serving as a main locator, a locating jig being disposed on the respective locator and configured to locate and support works having different configurations, the locating jig serving as a main locating jig, the main locating jig configured to move between the following states: an in-use state for locating and supporting the work, and a non-use state free from the locating and the supporting of the work, the work locating method by using an outer driver, comprising:

moving the main locator in such a manner that the main locator follows a moving path on the conveyor carriage to an original position on the moving path;
returning the main locating jig to the non-use state;
moving the main locator from the original position to a certain locating position on the moving path; and
moving the main locating jig from the non-use state to the in-use state,
to thereafter position and support the work on the main locator,
wherein the operation of moving the main locator is made from an outer part of the conveyor carriage,
wherein the outer driver is not connected to the conveyor carriage when the outer driver is not in use.

16. The work locating method according to claim 15, wherein the operation of returning the main locating jig is made from the outer part of the conveyor carriage.

17. The work locating method as claimed in claim 15, wherein the outer driver is spaced apart from the locator and the locating jig in the non-use state.

18. A work locating conveyor carriage, comprising:

a locator configured to locate and support a work, the locator serving as a main locator;
a locating jig disposed on the respective locator, the locating jig being configured to locate and support works having different configurations, the locating jig serving as a main locating jig, wherein the main locating jig is configured to move between the following states:
an in-use state for locating and supporting the work, and
a non-use state free from the locating and the supporting of the work,
the work locating conveyor carriage being configured to implement the following operations by using an outer driver:
moving the main locator in such a manner that the main locator follows a moving path on the conveyor carriage to an original position on the moving path,
returning the main locating jig to the non-use state,
moving the main locator from the original position to a certain locating position on the moving path, and
moving the main locating jig from the non-use state to the in-use state,
wherein the outer driver is configured to move the main locator from an outer part of the work locating conveyor carriage,
wherein there is one and only one outer driver.

19. The work locating conveyor carriage according to claim 18, wherein the outer driver includes an insert pin to be inserted into a holding hole of the main locating jig in a direction along the moving path.

20. The work locating conveyor carriage according to claim 19, wherein the outer driver has a base plate and an end plate oppositely connected to the base plate via a connecting rod which connects substantially a center of the base plate with substantially a center of the end plate, and the insert pin includes:

a first insert pin protruding from the base plate, and
a second insert pin protruding from the end plate to oppose the first insert pin.

21. The work locating conveyor carriage according to claim 18, wherein the outer driver turns the locating jig around a supporting shaft extending in a direction along the moving path from the outer part of the work locating conveyor carriage.

22. The work locating conveyor carriage as claimed in claim 18, wherein the outer driver is spaced apart from the locator and the locating jig in the non-use state.

23. The work locating conveyor carriage as claimed in claim 18, wherein the outer driver is not connected to the conveyor carriage when the outer driver is not in use.

* * * * *